United States Patent
Hsu et al.

(10) Patent No.: US 7,313,068 B2
(45) Date of Patent: Dec. 25, 2007

(54) APPARATUS AND METHOD FOR AUTOMATIC POWER CONTROL

(75) Inventors: Han-Wen Hsu, Hsin-Chu (TW); Chih-Hsiung Chu, Taipei Hsien (TW); Pao-Ping Ma, Hsin-Chu (TW)

(73) Assignee: MediaTek, Inc., Hsin-Chu Hsien (TW)

( * ) Notice: Subject to any disclaimer, the term of this patent is extended or adjusted under 35 U.S.C. 154(b) by 0 days.

(21) Appl. No.: 11/465,461

(22) Filed: Aug. 18, 2006

(65) Prior Publication Data

US 2006/0280080 A1 Dec. 14, 2006

Related U.S. Application Data

(62) Division of application No. 10/604,507, filed on Jul. 28, 2003.

(51) Int. Cl.
*G11B 7/00* (2006.01)

(52) U.S. Cl. .................. 369/53.26; 369/59.11

(58) Field of Classification Search ...................... None
See application file for complete search history.

(56) References Cited

U.S. PATENT DOCUMENTS

| | | | |
|---|---|---|---|
| 4,228,684 A | 10/1980 | Templin | |
| 4,504,937 A | 3/1985 | Yonezawa et al. | |
| 4,701,609 A | 10/1987 | Koishi et al. | |
| 5,398,227 A * | 3/1995 | Miyaoka et al. | 369/116 |
| 5,436,880 A * | 7/1995 | Eastman et al. | 369/47.51 |
| 6,661,757 B2 | 12/2003 | Chuang | |
| 6,990,050 B2 | 1/2006 | Shiozaki et al. | |
| 2002/0036961 A1 | 3/2002 | Eguchi et al. | |
| 2003/0099174 A1 | 5/2003 | Ota et al. | |
| 2004/0138298 A1 | 7/2004 | Ichikawa | |
| 2004/0184378 A1 | 9/2004 | Kwon et al. | |
| 2005/0025018 A1* | 2/2005 | Hsu et al. | 369/53.26 |
| 2005/0083828 A1* | 4/2005 | Chen | 369/116 |

* cited by examiner

*Primary Examiner*—Wayne Young
*Assistant Examiner*—Parul Gupta
(74) *Attorney, Agent, or Firm*—Winston Hsu

(57) ABSTRACT

An apparatus and method for automatic power control is disclosed. An optical recording apparatus utilizes a low-speed, peak-hold circuit to obtain and output a maximum of a front photodiode output signal during a predetermined window or plurality of windows of a total duration long enough to allow maximum peak-hold signal to stabilize. After stabilization, the maximum peak-hold signal is sampled and held in a sample and hold circuit. A reset then clears the signal and reinitializes the peak-hold circuit. In accordance with the difference between a reference voltage and the held peak-hold signal, a feedback controller unit outputs the required current level into a driving unit for producing desired recording pulses into a laser diode for recording information pits into an optical disc. A calibration gain may be used when, due to insufficient FPD response speed, the held signal is different than the real optical power output.

5 Claims, 19 Drawing Sheets

APPARATUS AND METHOD FOR AUTOMATIC POWER CONTROL

CROSS REFERENCE TO RELATED APPLICATIONS

This is a division of application Ser. No. 10/604,507, filed Jul. 28, 2003, from which the specification and drawings are carried forward without amendment.

BACKGROUND OF THE INVENTION

1. Field of the Invention

The present invention relates to a laser-power control apparatus employed in an optical recording device. More particularly, a power-control device for an optical disc recording system that controls the optical power stably during high-speed optical information recording even if using a relative low-speed front photodiode is disclosed.

2. Description of the Prior Art

A laser diode is usually used as a light source in a conventional optical recording apparatus. It is well known that the optical power output of a laser diode varies greatly with changes in environmental temperature. Accordingly, it is necessary to compensate for unwanted temperature-induced power fluctuations in the operation of laser diodes. A feedback control device for stabilizing the output power of a laser diode is called an automatic power control (APC) and is generally utilized in a conventional optical recording apparatus.

In order to record information pits into the optical recording medium, the optical output of the laser diode is modulated into recording pulses with different power levels and periods. This is referred to as the write strategy. FIG. 1 shows some common write strategies for present optical disc formats. To obtain a good recording quality, precise power control is necessary. A key to the success of the APC is a correct measurement of the optical output power of the laser diode.

FIG. 2 is a block diagram illustrating a prior art APC structure 10. In this figure, a laser diode LD radiates laser light onto an optical disc (not shown). The light radiated by the LD is received by a front photodiode FPD. The output of the FPD is converted into a voltage signal, front photodiode output (FPDO) signal, through a current-to-voltage conversion unit 20. The FPDO voltages corresponding to bias (read) power, erase power, and write power during reproduction and recording operations are respectively measured by a power level acquisition unit 30. The measured voltages are outputted by the power level acquisition unit 30 as $V_{b,m}$, $V_{e,m}$, and $V_{w,m}$. Feedback controller units 40, in accordance with the individual differences between the reference voltages $V_{b,r}$, $V_{e,r}$, and $V_{w,r}$ set by a reference power level setting unit 50 and the measured voltages $V_{b,m}$, $V_{e,m}$, and $V_{w,m}$, output the required bias level, erase level, and write level currents into an LD driving unit 60 for producing desired recording pulses into the LD for recording information pits into the optical disc.

To correctly measure the output power of a laser diode, a sample and hold circuit is usually employed in the power level acquisition unit 30 of a conventional optical recording apparatus. Various sampling signals are issued according to the information data to be recorded and the corresponding write strategy. Then the voltage levels of the FPDO during the bias period, erase period, and write period are sampled and held for feedback control. Precise power control is thus obtained despite fluctuations in the temperature of the LD. Nevertheless, it is implicitly assumed, in the sample and hold scheme, that the response speed of the FPD is approximately the same as the modulation speed of the recording pulse of the LD. In other words, the FPDO must follow tightly the changes of each recording pulse of the LD so that a sampling device can correctly sample the power levels of the LD from the FPDO. For example, as shown in FIG. 3, the time duration of the erase period in a rewritable optical disc format is generally long enough to allow the FPDO to closely approximate the recording pulse of the LD and provide a qualified sampling area for APC.

In a high-speed and/or high-density optical recording application, the response speed of the FPD is likely to be slower than the modulation speed of the recording pulse of the LD. This results in the FPDO having only a short time period in steady state. This problem is illustrated in FIG. 4 where even though the FPDO response reaches steady state near the end of an erase period, a medium-speed sampling device may fail to correctly sample the desired FPDO value.

Obviously, implementation of a high-response-speed sample and hold circuit is expensive. In certain recording formats such as those using blue laser diodes, the recording pulse widths are so short that correctly sampling the FPDO is impossible for present hardware implementation technology under the constraint of reasonable costs. Additionally, as the recording pulses get shorter and shorter, it is very likely that the response speed of the FPD is much slower than the modulation speed of the recording pulse of the LD. As shown in FIG. 5, the FPDO cannot correctly reflect the optical power output of the LD. In this situation, the real output power cannot be measured correctly even with the use of a perfect sample and hold circuit regardless of cost.

The sampling problems in obtaining the write and bias power levels get worse for those optical disc formats with a multiple pulse train write strategies shown in FIG. 1 because the time duration in a modulated multiple pulse is several times less than during a write/erase period. The FPDO will fluctuate, as shown in FIG. 5, and no sampling device can provide correct optical power measurement. In addition, some optical disc formats like blu-ray disc can also adopt a multi-pulse write strategy in the erase period, as shown in FIG. 1. There may be no available sampling areas in the FPDO for the power level acquisitions of the erase, write, and bias periods.

One method employed in the power level acquisition unit 30 is to use a peak (or bottom) envelope detection device, which continuously tracks the peaks (or bottoms) of the FPDO for feedback control. Chuang, herein incorporated by reference, discusses such a device in U.S. Patent Application Publication US 2002/0141313. Here, peak envelope signals outputted from the envelope detection devices are fed to standard sample and hold circuits, which in turn, output to the respective feedback control units. However, to reliably detect and reflect peaks (or bottoms) of the FPDO, the discharge time constant of a peak (or bottom) envelope detection device cannot be too large compared to that of the recording pulses of the LD. If the discharge time constant is too large, the peak (or bottom) envelope detection device may not correctly follow the FPDO. If the discharge time constant is too small, output from the peak (or bottom) envelope detection device may incur small dropouts in the detected peak (or bottom) envelope in spite of the same amplitude for each peak (or bottom) in the FPDO shown in FIG. 6.

Additionally, when the response speed of the FPD is much slower than the modulation speed of the recording pulse of the LD, the FPDO cannot achieve steady state within a recording pulse, and hence the output signal of a peak (or bottom) envelope detection device will also follow the variation due to write strategy, as shown in FIG. 7. Since a peak (or bottom) envelope detection device will track the local maximum peaks existing in the inputted pulses train, the power measured by a peak (or bottom) envelope detection device will continuously change because of the write strategy when an FPD with low response speed is used. Since the acquired power deviations result from the write strategy and temperature drifts simultaneously, the feedback controller unit will perform wrong power adjustments because of erroneously sensed FPDO variations resulting from write strategy. Consequently, it will be difficult to stably compensate real power fluctuation resulting from the effect of temperature.

SUMMARY OF THE INVENTION

It is therefore a primary objective of the claimed invention to provide an automatic power control (APC) structure which can perform a stable power control for a high-speed and/or high-density optical recording apparatus and uses simply a low-speed and low-cost sampling device even though a front photodiode with a relatively low response speed is employed. The objective is primarily obtained through the use of a multi-pulse peak-hold device that compensates for the slow response speed of the front photodiode without requiring expensive additional hardware. It is to be understood that the multi-pulse peak-hold device of the claimed invention may obtain a maximum (the highest peak) voltage or the multi-pulse peak-hold device of the claimed invention may obtain a minimum (the lowest bottom) voltage. The need for the acquisition and holding of a peak or a bottom depends on the requirement of power level measurements in an APC structure and the use of either a peak-hold circuit or a bottom-hold circuit as applied in this disclosure and the appended claims is within the intended spirit of the present invention.

A first embodiment of the present invention includes a peak-hold circuit and a sample and hold circuit. The peak-hold circuit has a first input for receiving a front photodiode (FPD) output pulse sequence (FPDO), a second input for receiving a reset signal from a control circuit, and an output for outputting a measured maximum voltage of the FPDO. The sample and hold circuit has a first input for receiving the output of the peak-hold circuit, a second input for receiving a sampling signal (SH) from the control circuit, and an output. In accordance with the difference between a reference voltage and the output of the sample and hold circuit, a feedback controller unit outputs the required current level into a laser diode (LD) driving unit for producing desired recording pulses into the LD for recording information pits into an optical disc.

The reset signal and the SH signal are used to measure the optical power output of the laser diode LD. The peak-hold circuit holds a maximum voltage value of the FPDO. After a predetermined time period, the sample and hold circuit samples the output of the peak-hold circuit according to the sampling signal SH issued by the control circuit. After sampling, the reset signal is issued by the control circuit to reinitialize the peak-hold circuit.

A second example of the present invention includes the components and functions of the first embodiment and further includes a switch for controlling transmission of the FPDO from the front photodiode to the peak-hold circuit according to a window signal received by the switch from the control circuit. During the predetermined time period, one or more active window signals are issued by the control circuit allowing the peak-hold circuit to receive, monitor, and hold the maximum voltage value of the FPDO only during active window signals. The use of a window signal may select random sequences of recording pulses from the FPDO pulses train or allow only consideration of fixed data patterns that make local maximum peaks in the FPDO, such as the combination of a longest bias period and a shortest writing period. After a predetermined number of window signals have allowed the peak-hold circuit to hold the maximum voltage value of the FPDO occurring during active window signals, the control circuit issues the sampling signal SH and causes the sample hold circuit to sample and hold the output voltage of the peak-hold circuit. After sampling, the control circuit issues the reset signal to re-initialize the peak-hold circuit.

Additionally, all examples of the present invention may include a calibration gain. The calibration gain is a proportional constant and may be used to realize the real optical power output when, due to insufficient FPD response speed, the output of the multi-pulse peak-hold device is different than the real optical power output. The proportional constant indicates a predefined relationship between a real maximum optical output power level and a maximum measurable optical output power level. The proportional constant may be implemented either by adjusting the output of the sample and hold circuit or by adjusting the reference voltage and may be implemented merely by a change in the firmware of the reference power level setting unit.

These and other objectives of the present invention will no doubt become obvious to those of ordinary skill in the art after reading the following detailed description of the preferred embodiment that is illustrated in the various figures and drawings.

DETAILED DESCRIPTION

Figure 8:
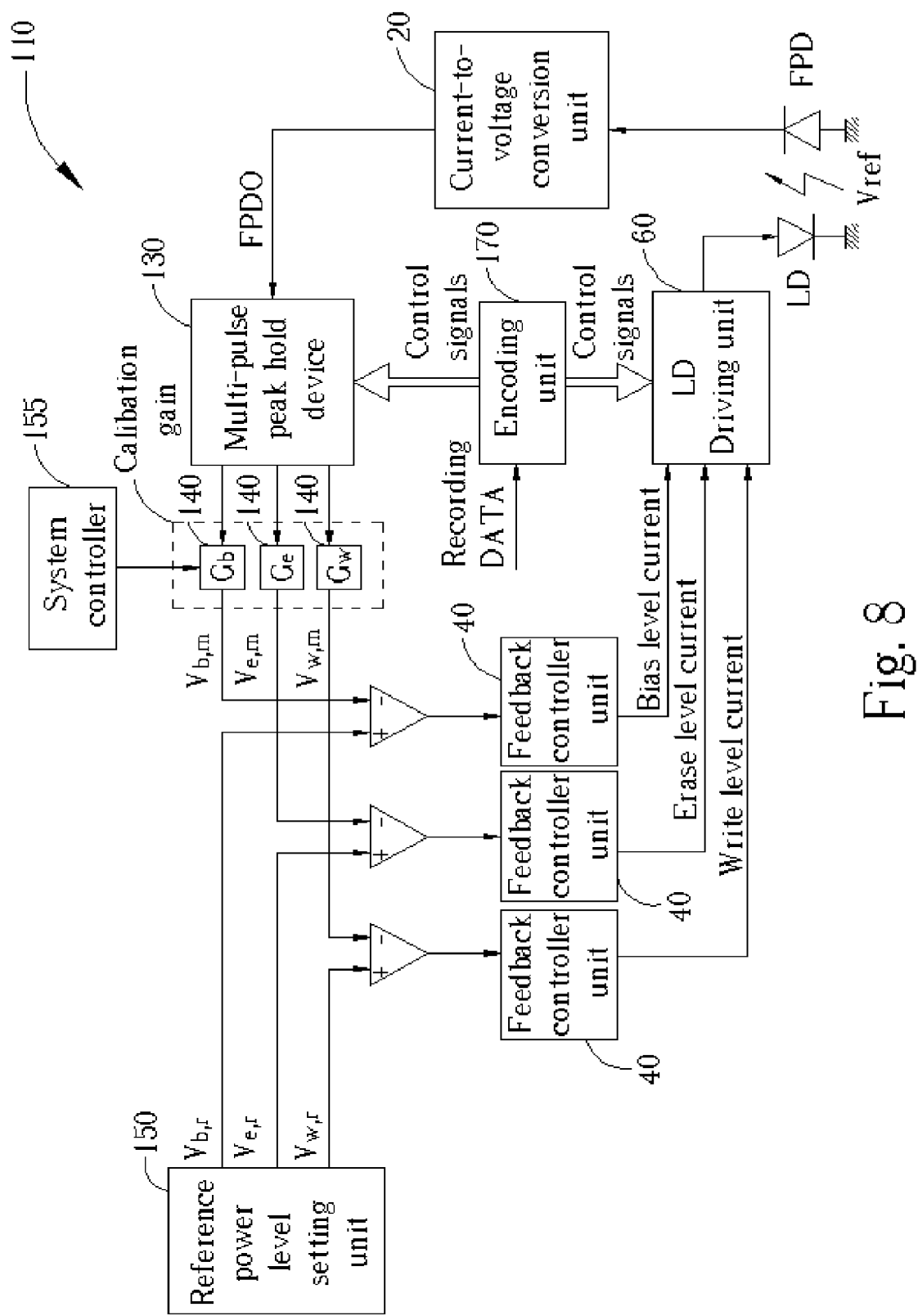
FIGS. 8-10 are block diagrams of an Automatic Power Control according to the present invention.

The present invention proposes a multi-pulse peak-hold device in a power level acquisition unit, instead of using a high-speed sample and hold circuit such as those frequently adopted in a conventional optical recording apparatus. FIG. 8 is a block diagram of the present invention if three power level controls are configured in an Automatic Power Control (APC) structure 110. Similar reference numerals are used for those components of the APC 110 that serve the same function as the corresponding components of the prior art APC 10. These functions have been previously described in this paper and will not be again elaborated on here. The obvious differences in the present invention APC 110 from the prior art are the multi-pulse peak-hold (or bottom-hold) device 130 and the calibration gain 140 located in the output of the multi-pulse peak-hold (or bottom-hold) device 130 that is manifested in high-speed and/or high-density optical storage applications when a relatively low speed front photodiode (FPD) is used. The use of the calibration gain will be discussed later in this application.

For ease of illustration, only the use of a peak-hold circuit will be discussed in the various embodiments of the present invention. It is to be understood, however, that this limitation is only to facilitate the disclosure and in no way is intended to limit the scope of the present invention. The term "peak-hold circuit" in this disclosure is defined as a device capable of acquiring and holding a voltage reflecting a portion of an electrical signal having maximum amplitude or a device capable of acquiring and holding a voltage reflecting a portion of an electrical signal having minimum amplitude. The need for the acquisition and holding of a maximum or a minimum amplitude depends on the requirement of power level measurements in an APC structure and the use of either a peak-hold circuit or a bottom-hold circuit as applied in this disclosure and the appended claims is within the intended spirit of the present invention.

Figure 9:
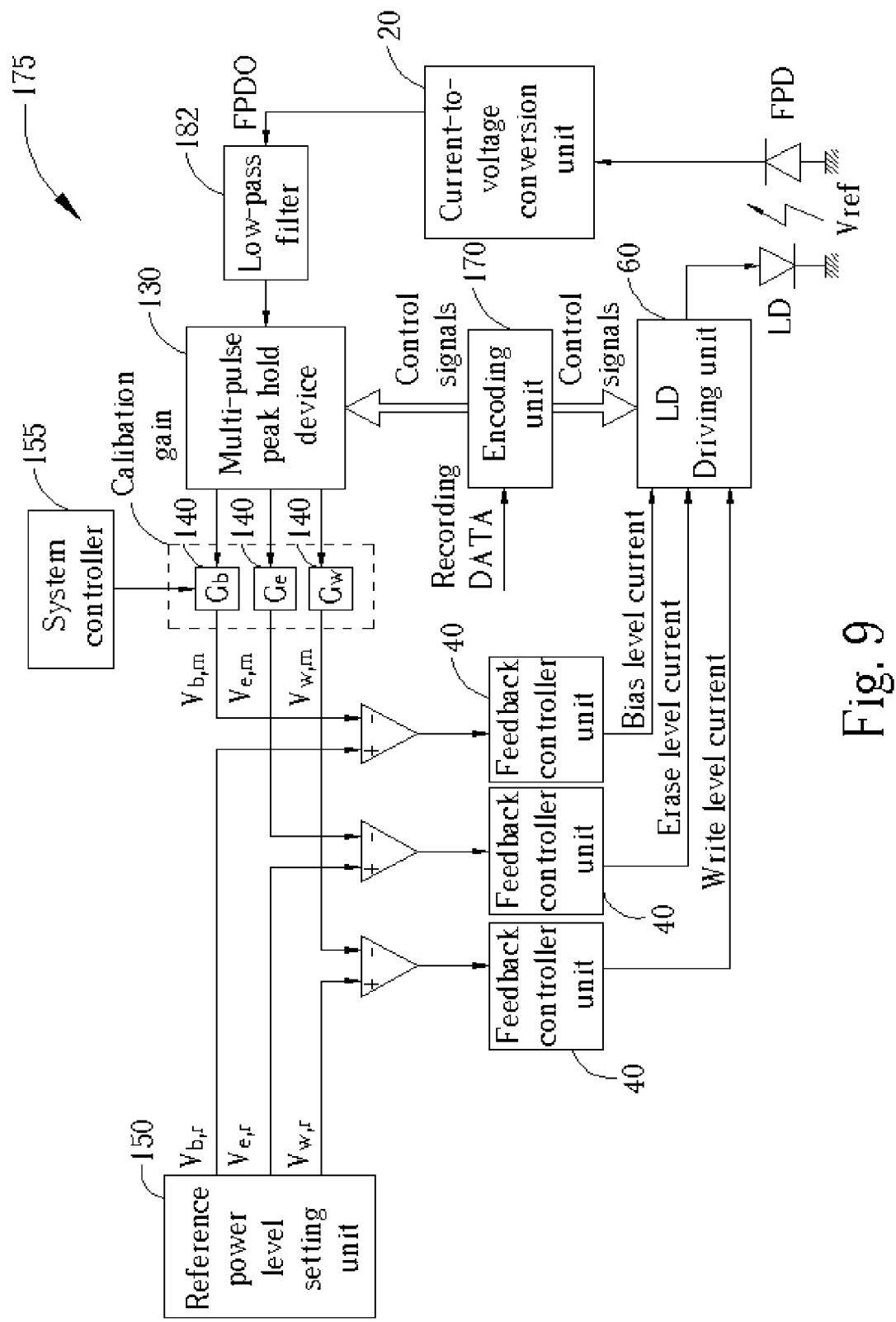

It is well known that there must exist parasitical noise within the FPD circuit. Accordingly a low-pass filter is usually employed to alleviate noise effect on the FPDO output. Another implementation of the present invention 175 including a low-pass filter 182 between the current to voltage conversion unit 20 and the multi-pulse peak-hold device 130 is shown in FIG. 9. The effect of low-pass filter 182 on the output of the multi-pulse peak-hold device 130 can also be compensated for by the calibration gain.

Figure 10:
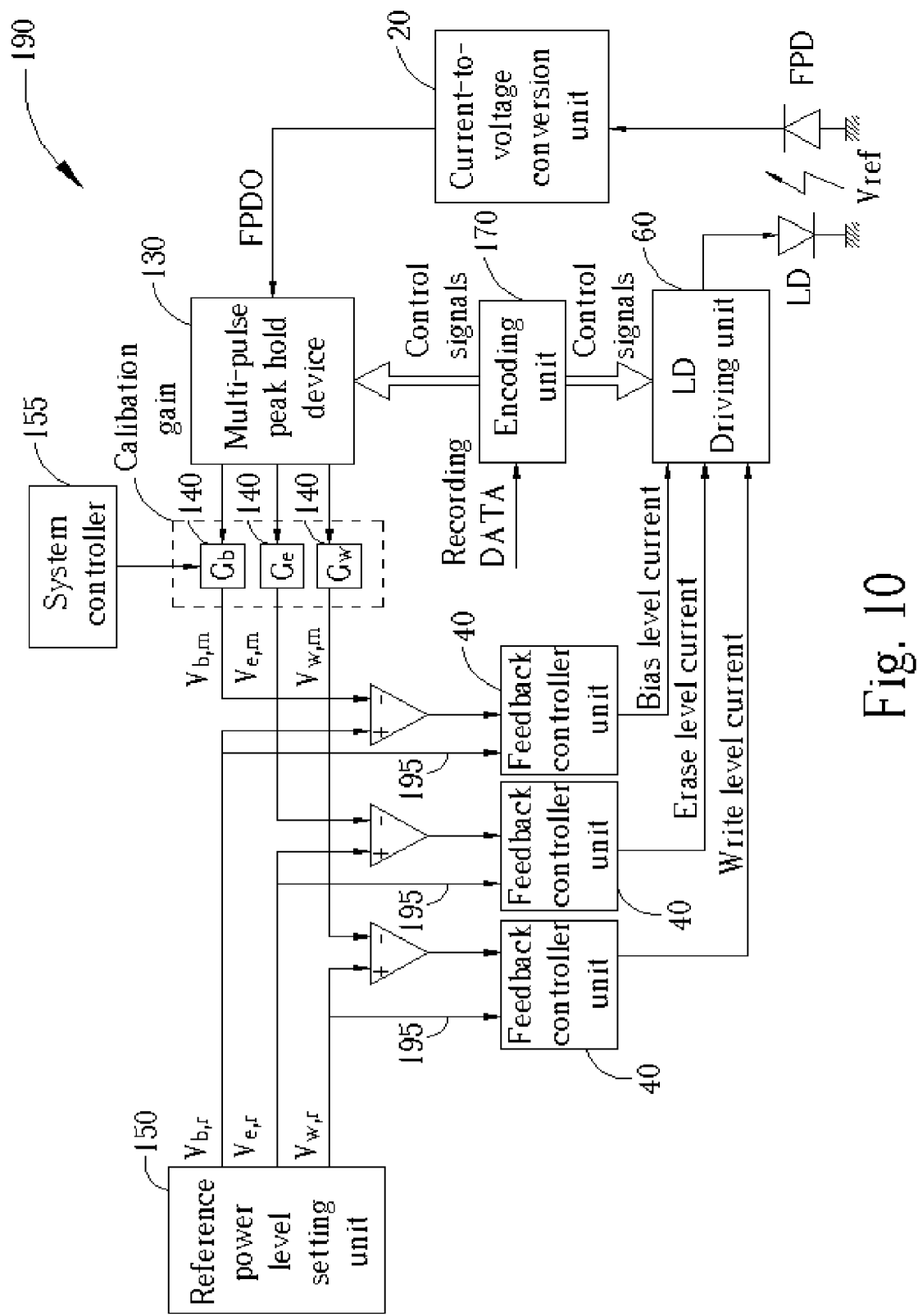

It should be noted that a forward path from the reference voltage setting unit 150 to the feedback controller unit 40 may be configured for the respective power level control in an APC structure to speed-up its transient response when operating from a reading state to a writing state in a conventional optical recording apparatus. FIG. 10 is a block diagram showing the application of the present invention 190 if forward paths 195 are added to each APC loop.

Figure 11:
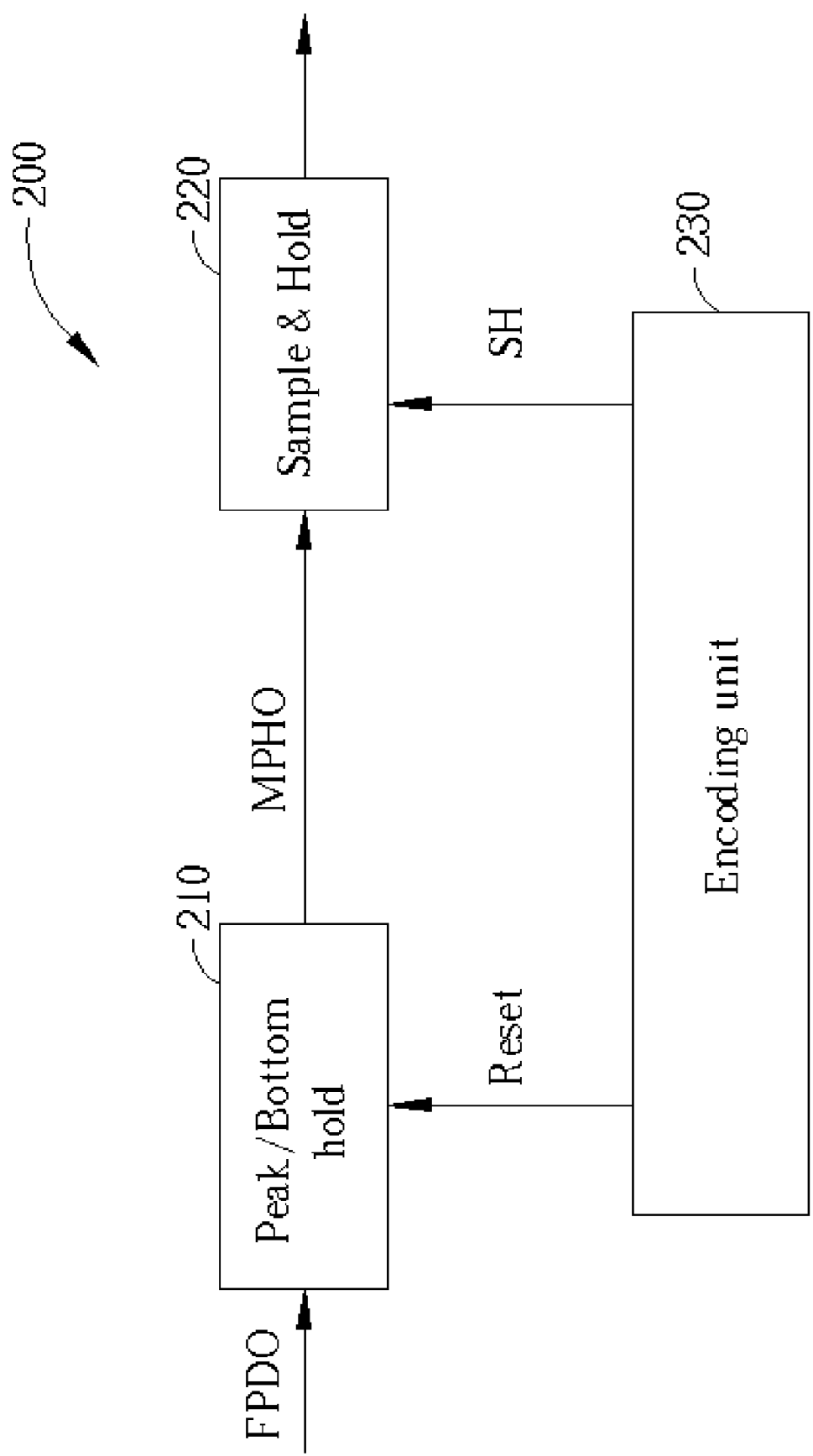
FIG. 11 is a block diagram of a multi-pulse peak-hold circuit according to the present invention.

FIG. 11 illustrates a first embodiment of the present invention multi-pulse peak-hold device 200. The multi-pulse peak-hold device 200 comprises a peak-hold circuit 210 and a sample and hold circuit 220. The peak-hold circuit 210 comprises a first input for receiving a front photodiode (FPD) output pulse sequence (FPDO), a second input for receiving a reset signal from an encoding circuit 230, and an output for outputting a measured maximum voltage of the FPDO. The sample and hold circuit 220 comprises a first input for receiving the output of the peak-hold circuit 210, a second input for receiving a sampling signal (SH) from the encoding circuit 230, and an output electrically connected to one of the Feedback control Units 40 (FIG. 8).

The reset signal and the SH signal are used to measure the optical power output of a laser diode LD (not shown). The peak-hold circuit 210 holds the maximum voltage value of the FPDO, denoted as a Maximum Peak-Hold Output (MPHO) signal, which is received by the first input of the sample and hold circuit 220. The sample and hold circuit 220 samples the MPHO according to the sampling signal SH. After sampling, the reset signal is issued by the encoding unit 230 to reinitialize the peak-hold circuit 210. Although the SH signal and the reset signal are described here as originating from the encoding unit 230, another embodiment of the present invention may provide for one or more of these signals to originate from another control circuit within the optical recording apparatus.

Figure 12:
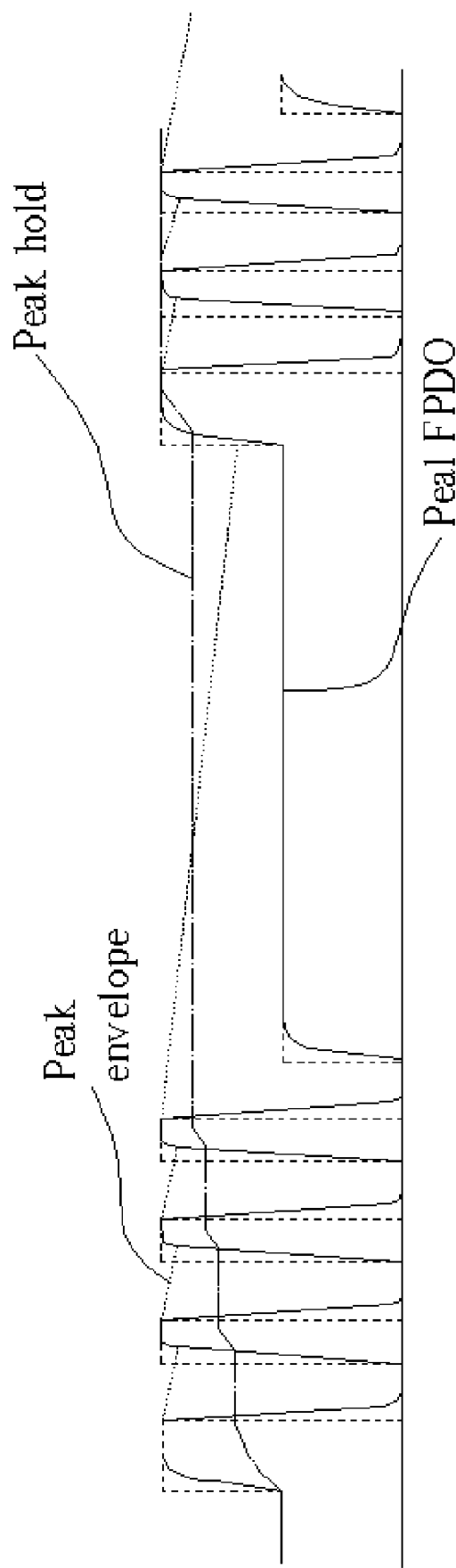
FIGS. 12-13 contrast the action of a present invention peak-hold circuit with that of a prior art peak envelope circuit.
Figure 13:
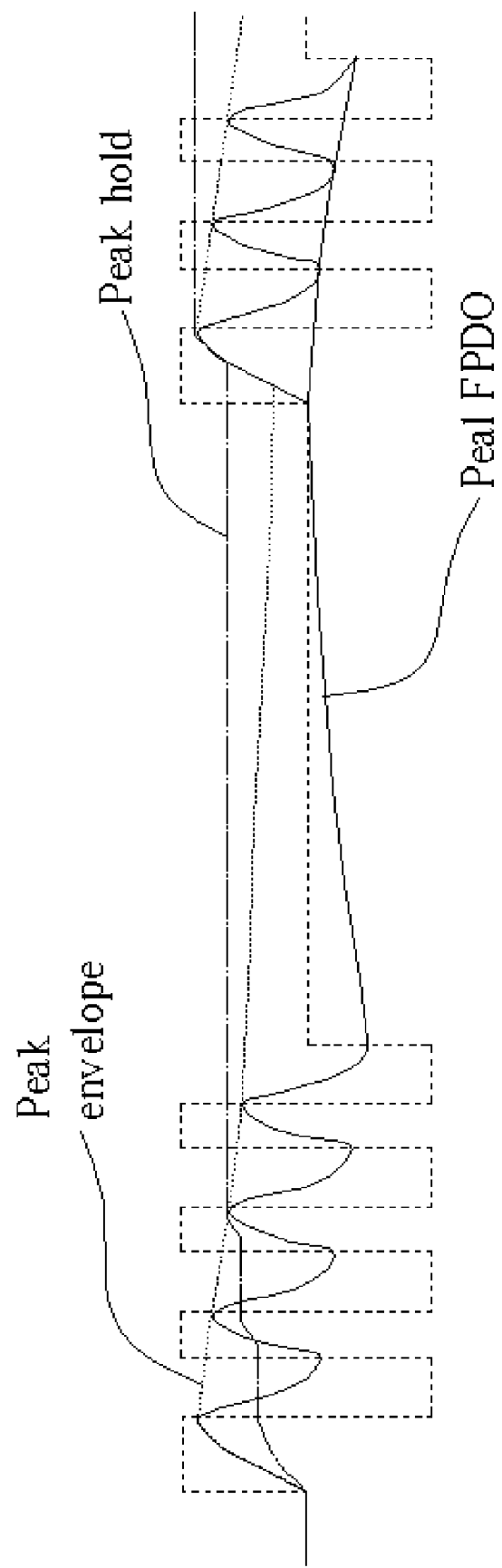

FIG. 12 and FIG. 13 contrast the action of the peak-hold circuit 210 with that of a prior art peak envelope circuit. In FIG. 12, the response speed of the FPD is approximately the modulation speed of the recording pulse of the LD and the FPDO goes to steady state in each pulse. That is, the peaks in the FPDO pulses are equal in magnitude no matter what write strategy is used. A low-speed peak-hold circuit 210 can follow the peaks up after a certain number of pulses and hold it, as shown in FIG. 12. Subsequently, a low-speed sample and hold circuit is satisfactory for sampling the real write power of the LD by an appropriate sampling signal SH. Namely, by using a low-speed peak-hold circuit 210 and a low-speed sample and hold circuit 220, the write power will be measured correctly. The result is superior to that of using the prior art peak envelope detection device in the power level acquisition unit 30, in the sense that the peak-hold circuit 210 of the present invention substantially avoids the slight dropout in the detected peak envelope as shown in FIG. 12.

In FIG. 13, the response speed of the FPD is slower than the modulation speed of the recording pulse of the LD. As discussed previously, in a high-speed recording case, the FPDO may only very briefly attain a steady state within each recording pulse and the peaks of the FPDO may not accurately measure the true write power. However, by means of a low-speed peak-hold circuit 210, the local maximum of the peaks can be followed up and held after a certain number of pulses. If a higher peak is encountered, the peak-hold circuit 210 will track tightly, resulting in the holding of the maximum peak of the FPDO given a repeated set of recording pulses within a predetermined time span.

Because there will be several equivalent highest peaks and a few peaks very close to the highest peaks within the predetermined time span, the MPHO will approach them stably in the considered time span. The reason is briefly described here. The recording pulse train can be viewed as the superposition of many single recording pulses occurring in different timings and the FPDO is the superposition of the FPD response for each single recording pulse.

It is noted that the FPD response for a single recording pulse of short period will go to zero after a certain time duration. For example, consider a relatively low-speed FPD with time constant 2 T receiving a recording pulse with a 0.5

T pulse width at a point 20 T before the next recording pulse, where T is the period of the channel bit clock for the considered optical storage application. For simplicity, only first-order response is taken into account here for a low-speed FPD. It can then be approximated mathematically that less than 0.003% of the FPD response of the considered recording pulse will remain at the starting point of the next recording pulse that is 20 T away. That means that only those recording pulses within several channel bits before the next recording pulse will contribute to any significant degree to the FPD response at the starting point of the next recording pulse, which can be regarded as the initial condition of the FPD response for the next recording pulse.

Because the combined patterns by the recording pulses for a short time, e.g. 20 T, are limited and will repeat many times within a certain time span, close initial conditions occur many times within that span. Accordingly, the FPD response of each next recording pulse depends greatly on the width of that next pulse and the initial condition and also results in many responses similar in amplitude within a certain time span because of finite pulse widths and combined patterns. Hence it is expected that the FPDO gets several equivalent highest peaks and a few peaks very close to the highest peaks within a certain time span, and MPHO will be held almost fixed after a short time interval in the considered time span by a low-speed peak-hold circuit.

Figure 14:
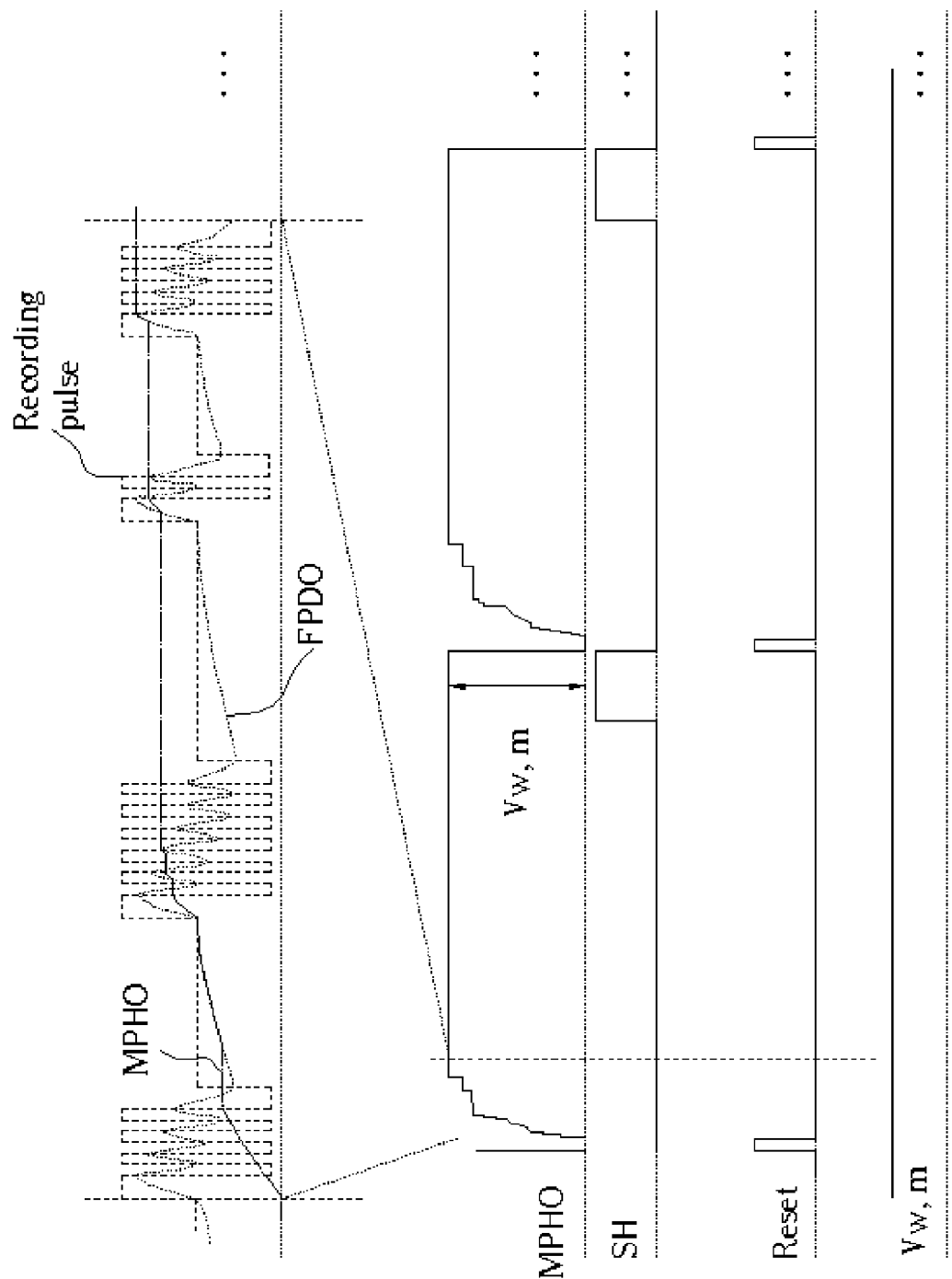
FIG. 14 illustrates the operation of the multi-pulse peak-hold circuit in FIG. 11 when a relatively low-speed FPD is used.

FIG. 14 is a diagram illustrating the operation of the multi-pulse peak-hold device 200 if an FPD with low response speed is used. In this optical storage example, the steady state of the FPDO in the erase period is so short that it is inconvenient for power sampling. However, the write power can still be acquired via the peak-hold circuit 210 employed in the multi-pulse peak-hold device 200. The sampling signal SH is issued to sample the MPHO in a frequency much lower than that of the recording pulses because the bandwidth requirement of the APC response is low. The time span necessary for the MPHO to come to a stable state can be experimentally determined. The reset signal is issued after the sampling signal SH goes low to clear the MPHO and to re-initialize the action of the peak-hold circuit 210. The output of the multi-pulse peak-hold device 200 is $V_{w,m}$ which is maintained approximately constant if there is no temperature drift. As a result, a low-speed sample and hold circuit 220 is capable of acquiring the maximum value of the FPDO during high-speed and/or high-density optical storage applications.

Although the MPHO may be different from the real optical power output of a laser diode due to slow FPD response speed, the ratio of the measured power to the real power signifying the response capability of FPD or the sensor gain under specified recording speed can be obtained through an identification procedure. Then the calibration gain in the output of multi-pulse peak-hold device can be set equal to the inverse of the ratio. Then, precise write power control can be achieved. A detailed description of the identification procedure will be explained later.

While those skilled in the art may recognize that, in another implementation of the present invention, it may be possible to omit the sample and hold circuit 220 from the above-described device, it is preferred to include the sample and hold circuit 220 to avoid the unnecessary variations in the output of the peak-hold circuit 210 immediately following the reset signal.

Similarly, a low-speed bottom-hold circuit can also be used in the multi-pulse peak-hold device 200 to hold the minimum value of the bottoms in the FPDO. A low-speed sample and hold circuit 220 is also capable of acquiring the bias power for low-speed optical storage applications or that of the minimum value in the FPDO for high-speed and/or high-density optical storage applications even though an FPD with relative low response speed is employed.

Figure 15:
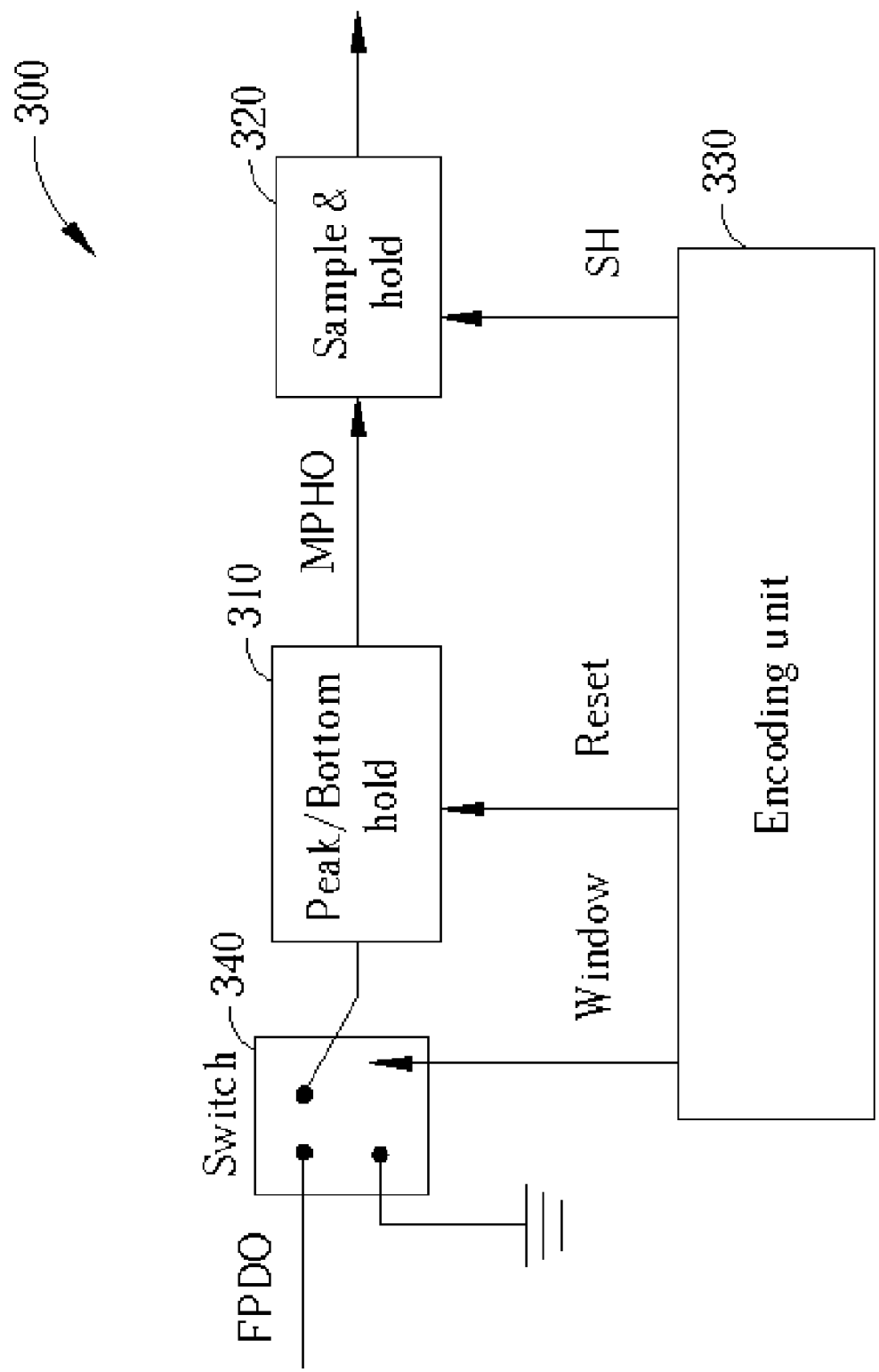
FIG. 15 is a block diagram of another multi-pulse peak-hold circuit according to the present invention.

FIG. 15 is another multi-pulse peak-hold device 300 according to the present invention. The multi-pulse peak-hold device 300 comprises a switch 340, a peak-hold circuit 310, and a low-speed sample and hold circuit 320. As with the all embodiments of the present invention, the choice of using a peak-hold circuit 310 or a bottom-hold circuit 310 depends on the requirement of power level measurements in an APC structure and the use of either is intended to fall within the spirit of the invention.

The peak-hold circuit 310 comprises a first input for receiving a front photodiode output (FPDO) pulse sequence, a second input for receiving a reset signal from either the encoding circuit 330 or possibly from another control circuit, and an output for outputting a measured maximum voltage of the FPDO. The sample and hold circuit 320 comprises a first input for receiving the output of the peak-hold circuit 310, a second input for receiving a sampling signal (SH) from the encoding circuit 330 (or possibly from another control circuit), and an output electrically connected to one of the feedback control units 40 (FIG. 8). The reset signal and the SH signal are used to measure the optical power output of a laser diode LD (not shown). The peak-hold circuit 310 holds the maximum value of the FPDO, denoted as a Maximum Peak-hold Output (MPHO) signal, which is received by the first input of the sample and hold circuit 320. The sample and hold circuit 320 samples the MPHO according to the sampling signal SH. After sampling, the reset signal is issued to reinitialize the peak-hold circuit 310.

An obvious difference in the multi-pulse peak-hold device 300 from the multi-pulse peak-hold device 200 is the addition of the switch 340 controlling the transmission of the FPDO to the peak-hold circuit 310 according to a control signal "window" from the encoding unit 330. The window signal may select random sequences from the FPDO pulse train. The feasibility of selecting random FPDO sequences is similar to that of the first embodiment of the present invention 200 because the MPHO, after a certain time interval, comes to a stable value for random FPDO sequences. The width of the window signal (the time span) can be experimentally determined. The window signal may also select a predetermined FPDO sequence according to fixed recording data patterns. The example of selecting a FPDO pulse sequence with predetermined recording data patterns will be discussed later.

In a case where the response speed of the FPD is approximately the same as the modulation speed of the recording pulse of the LD, the FPDO goes to steady state in each pulse. Therefore, the use of the switch 340 and window signal can be effectively omitted and the present implementation can easily function similarly to that of FIG. 11 by maintaining an active window signal and setting the sampling signal SH in FIG. 11 as the logical AND operation of the two signals, SH and window, in FIG. 15.

In a case where the response speed of the FPD is slower than the modulation speed of the recording pulse of the LD, e.g. in high-speed recording, the FPDO may only very briefly attain a steady state within each recording pulse or even worse the FPDO may never attain a steady state, as previously discussed. Accordingly, the peaks of the FPDO are much likely to be fluctuant, not always correctly indicating the real LD power level. Through the use of a window signal, only those recording data patterns that make local maximum peaks or attain values near local maximum peaks in the FPDO sequence need be considered. As a result, the MPHO will attain a stable value. For example, the special combination of the longest bias (erase) period and the shortest writing period, corresponding to a data pattern of the longest land and the shortest pit, usually produces a maximum or a near fixed FPDO value because the longest bias (erase) period will result in close initial conditions for the following recording pulse and the shortest write period often starts with the widest recording pulse. The window signal can be enabled at the start of that pattern and can be disabled at the end of the pattern.

Figure 16:
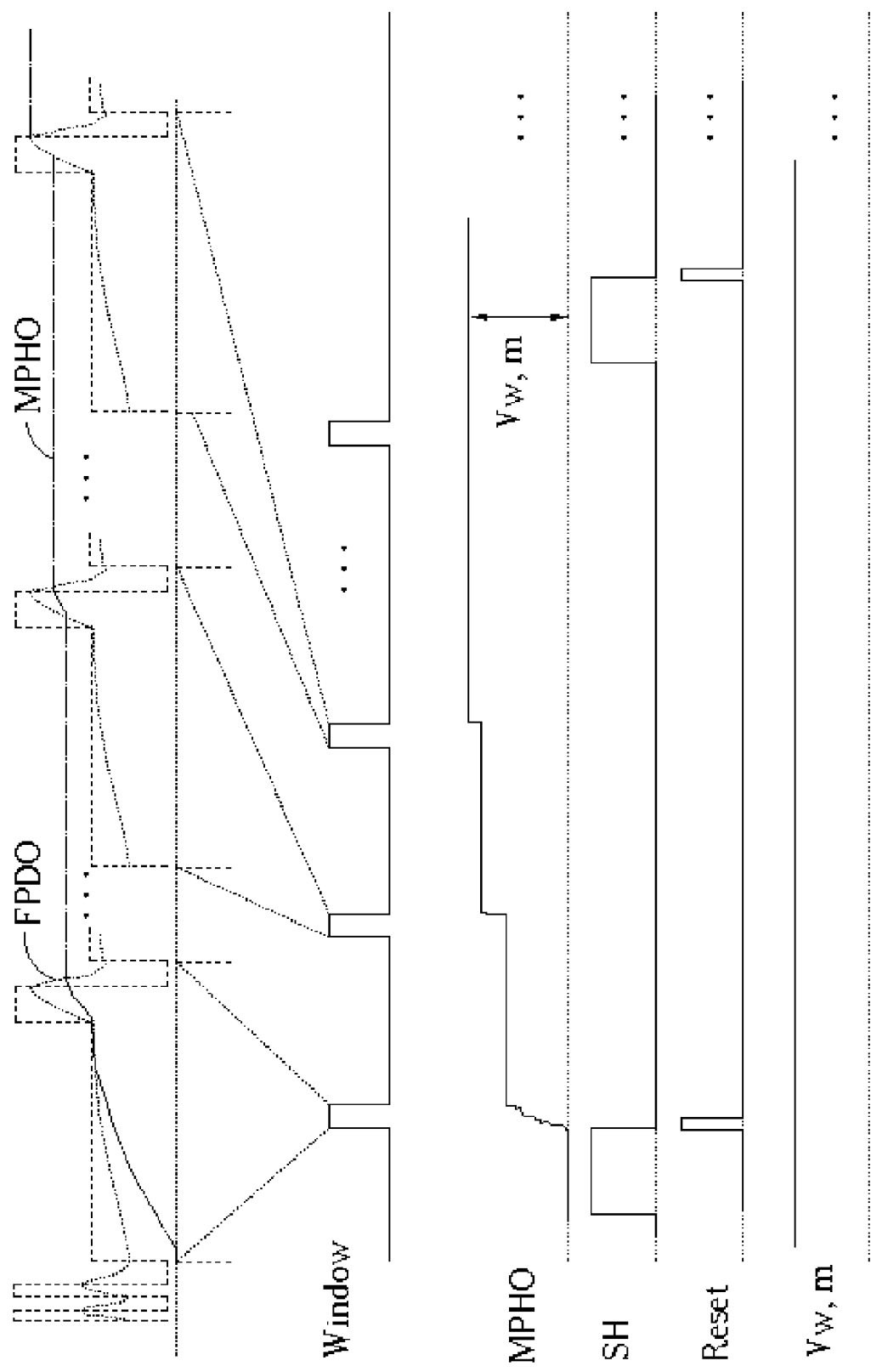
FIG. 16 illustrates the operation of the multi-pulse peak-hold circuit in FIG. 15 when a relatively low-speed FPD is used.

Though the response speed of the peak-hold circuit adopted is much slower than that of the FPDO, the MPHO may achieve maximum after several window signals. Then a low-speed sample and hold circuit at low-cost is qualified for sampling the MPHO. After sampling, a reset signal is used to re-initialize the peak-hold circuit. FIG. 16 illustrates the operation of the multi-pulse peak-hold device 300 when a relatively low-speed FPD is used. In this optical storage example, the steady state of the FPDO in the erase period is so short that it is inconvenient for power sampling. Thus the window signal is issued to sift the pattern consisting of the longest erase period and the shortest write period.

Figure 1:
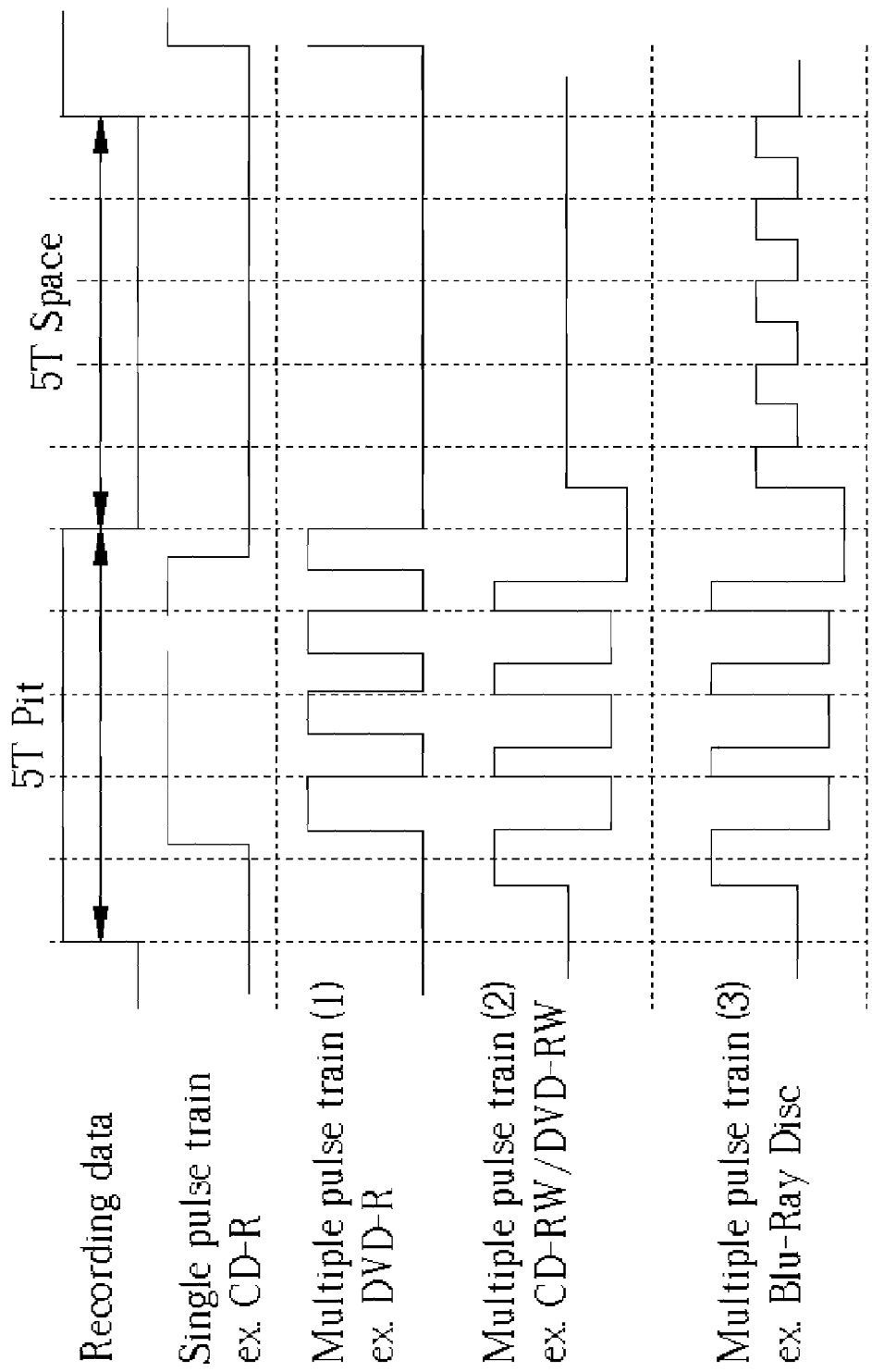
FIG. 1 shows some write strategies for present optical disc formats.
Figure 2:
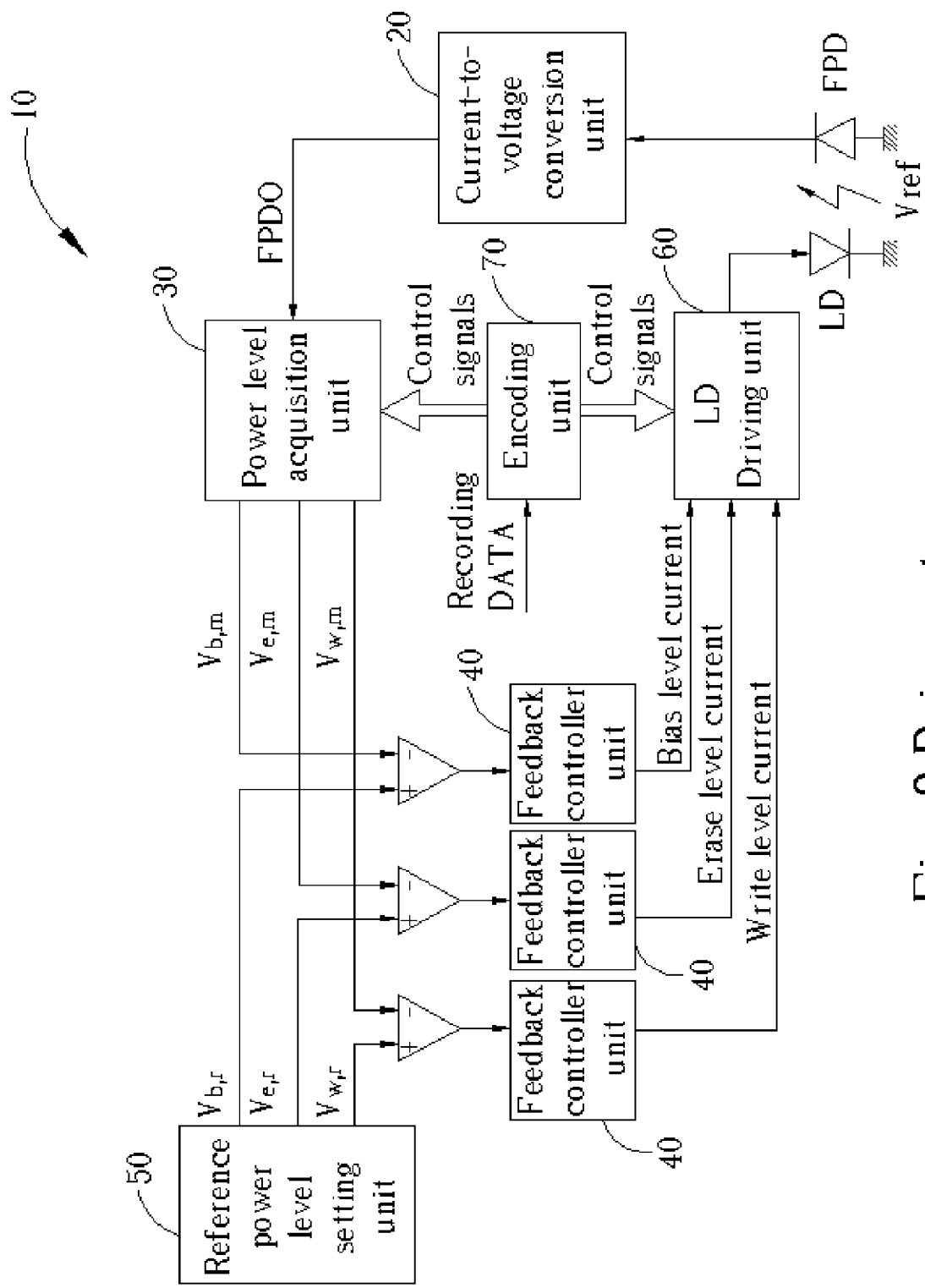
FIG. 2 is a block diagram illustrating a prior art Automatic Power Control apparatus.
Figure 3:
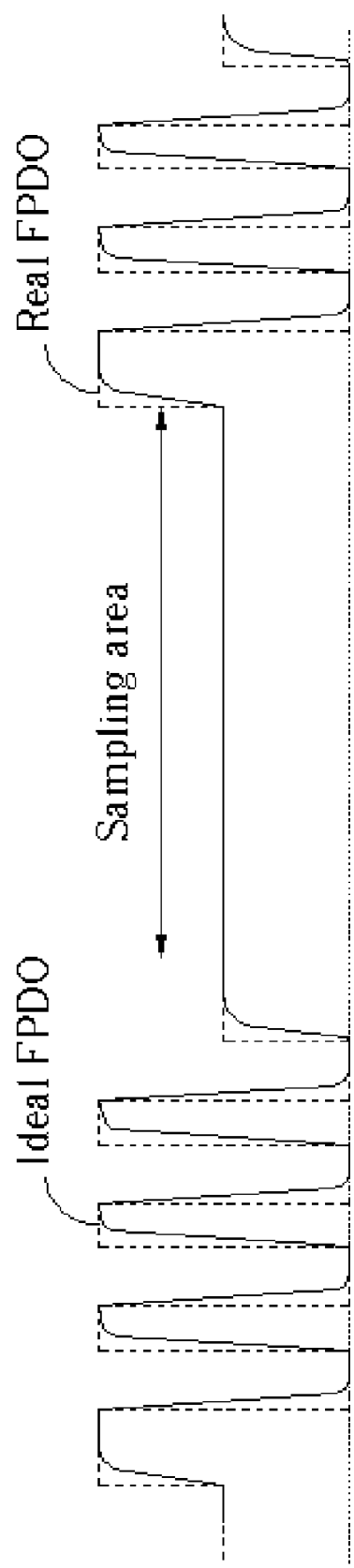
FIG. 3 illustrates the FPDO in closely approximation of the recording pulse during an erase period.
Figure 4:
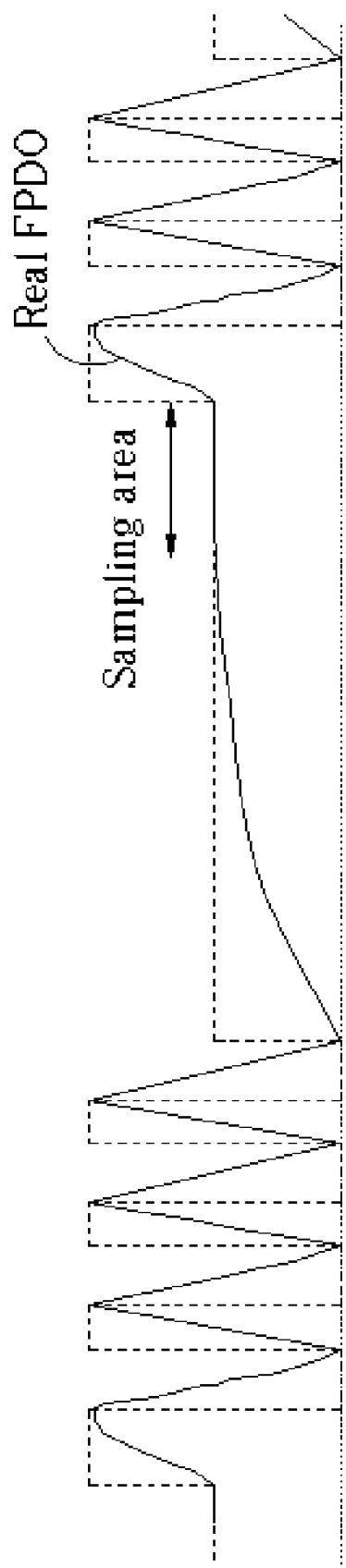
FIG. 4 illustrates the FPDO reaching steady state near the end of an erase period.
Figure 5:
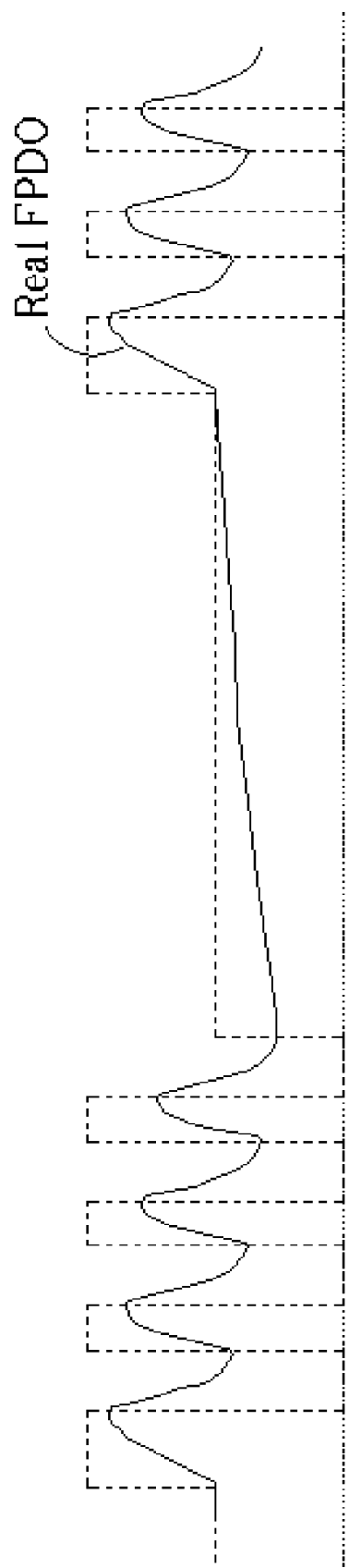
FIG. 5 illustrates the FPDO unable to reach steady state.
Figure 6:
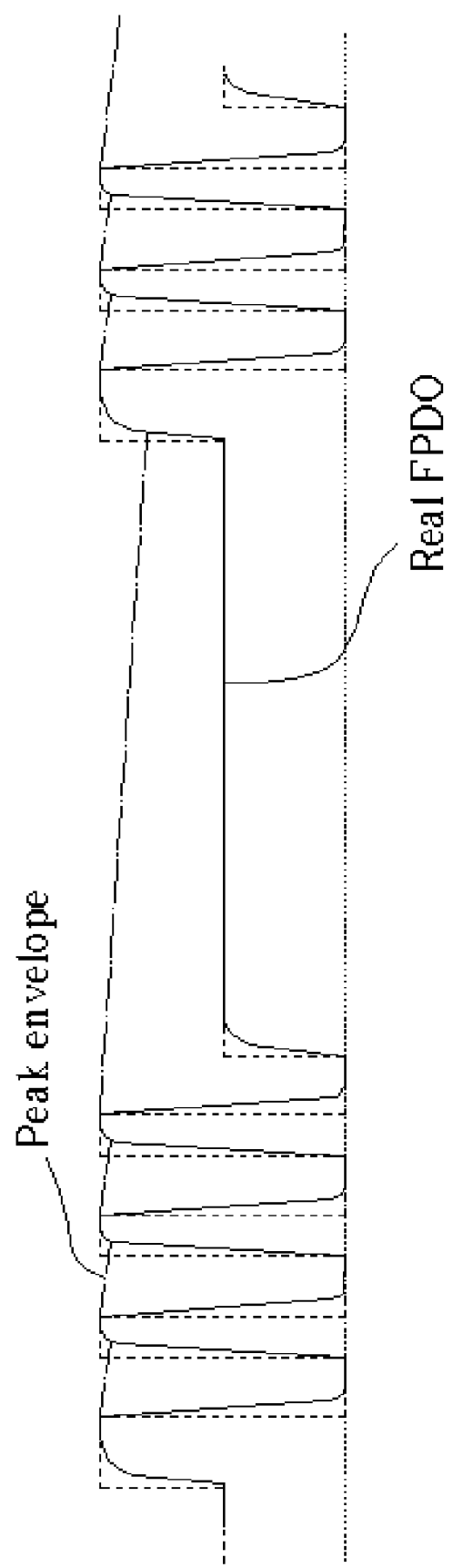
FIG. 6 illustrates a peak envelope waveform during changes in the FPDO.
Figure 7:
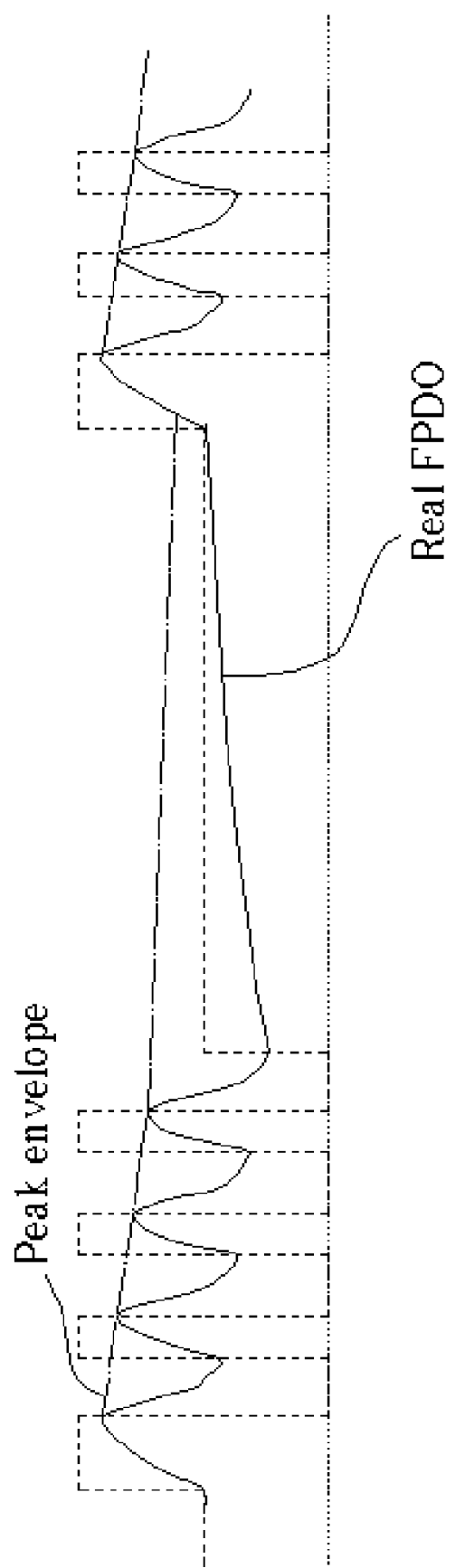
FIG. 7 illustrates a peak envelope waveform during changes in write strategy.

Additionally, in some high-speed and/or high-density optical storage applications, the FPDO corresponding to the erase period is not suitable to be sampled on account of a too short sampling area as shown in FIG. 4 or no sampling area as shown in FIG. 5. The window signal can be issued to coincide with the longest erase period. Then, using the present invention, a low-speed peak-hold circuit can hold the erase power or the maximum achievable FPDO within the erase period.

Furthermore, for optical disc formats with a multiple pulse train in the erase period like blu-ray disc, a peak-hold or bottom-hold circuit can be used to hold the maximum or minimum achievable erase power. The reasoning is the same as the aforementioned peak-hold or bottom-hold circuit used in obtaining the maximum write power or the minimum bias power.

Accordingly, the write power, erase power, and bias power used in an APC structure can be acquired from the multi-pulse peak-hold device by appropriate employment of a peak-hold circuit and/or a bottom-hold circuit. If three power levels are required in the APC structure as shown in FIG. 8, a peak-hold circuit for the write power, a bottom-hold circuit for the bias power, and a peak-hold circuit for the erase power can be simultaneously applied in the multi-pulse peak-hold device 110.

Figure 17:
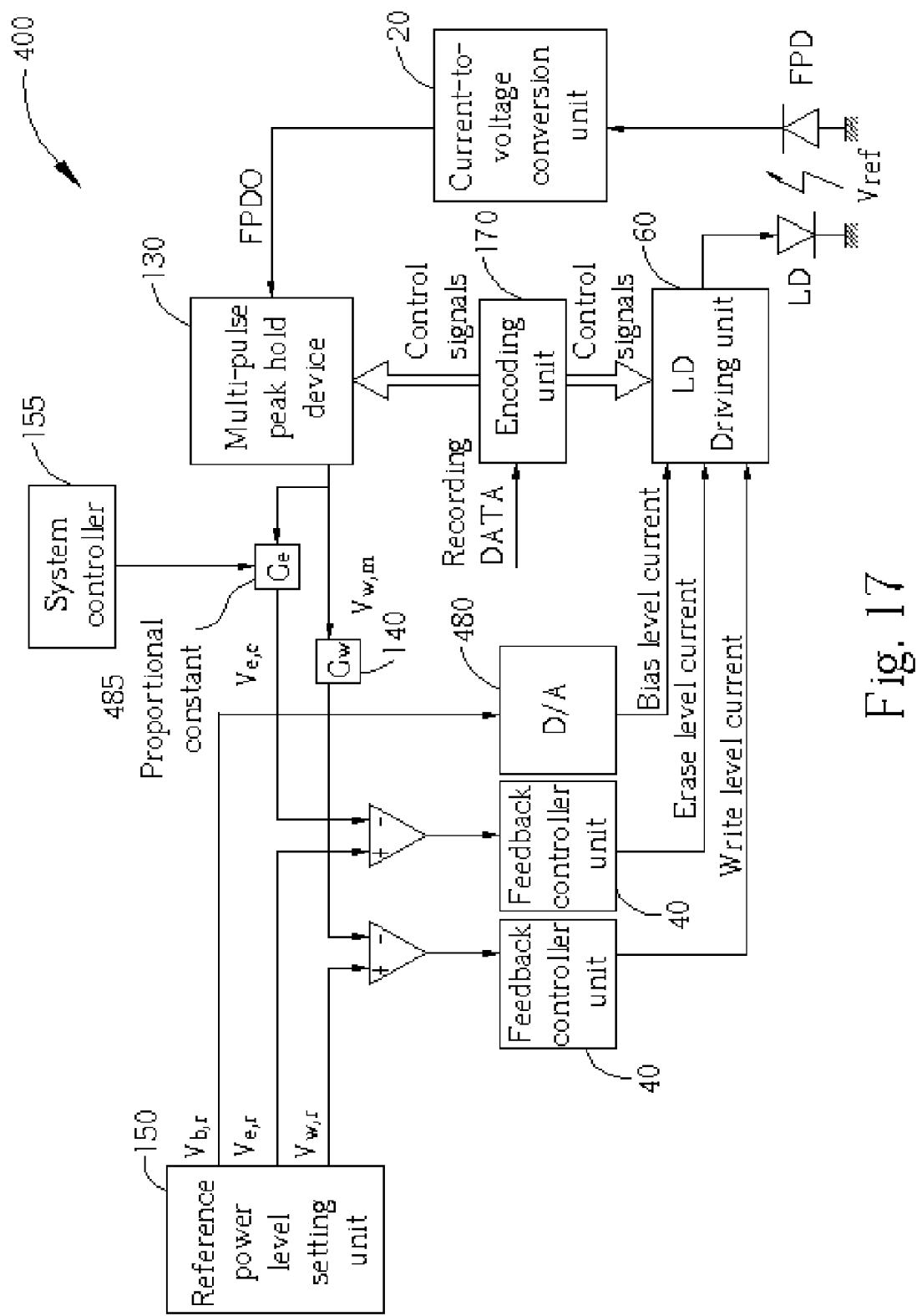
FIG. 17 is a block diagram of another multi-pulse peak-hold circuit according to the present invention.

If only one power level must be measured in an APC structure, only one peak-hold or one bottom-hold circuit is needed in the multi-pulse peak-hold device 300 to obtain the required power level. The other power level can be referred from the measured power level. FIG. 17 illustrates an implementation of an APC structure 400 where only the write power level is measured because the write power has a better Signal to Noise Ratio (SNR) than the erase power. The bias power is controlled by an open-loop control method, i.e. the reference power level setting unit 150, via a digital to analog converter 480, sets the bias level current directly. The write power is precisely controlled with a feedback controller unit 40 by means of a multi-pulse peak-hold device 130 embedded in the loop. Since it is reasonable to assume that a linear relationship exists between the power and the current for an LD when the current exceeds its threshold level, the erase power is nearly fixed proportionally to the write power. Consequently, if the write power is accurately measured, the erase power can be referred to from the write power by multiplying it with a proportional constant 485 $C_e$. As a result, the erase power can be controlled by such a pseudo-closed loop method.

If the write power level and the erase power level are both necessary for closed-loop control in an APC structure, two peak-hold circuits can be employed in the multi-pulse peak-hold device to obtain the required measurements of write power and erase power, respectively. The bias power can be controlled by an open-loop control method, like the one shown in FIG. 17. That is, the recording power levels can be acquired from the multi-pulse peak-hold device by appropriate employment of a peak-hold circuit and/or a bottom-hold circuit if necessary. The present invention can also be constructed easily in other APC structures for those familiar with the art.

It should noted that the MPHO may be different from the real optical power output of the laser diode due to insufficient FPD response speed as shown in FIG. 14 and FIG. 16. However, precise output power control of the LD can be realized via a proper calibration procedure. In the following paragraphs, a calibration approach is disclosed that may be used in the present invention.

Figure 18:
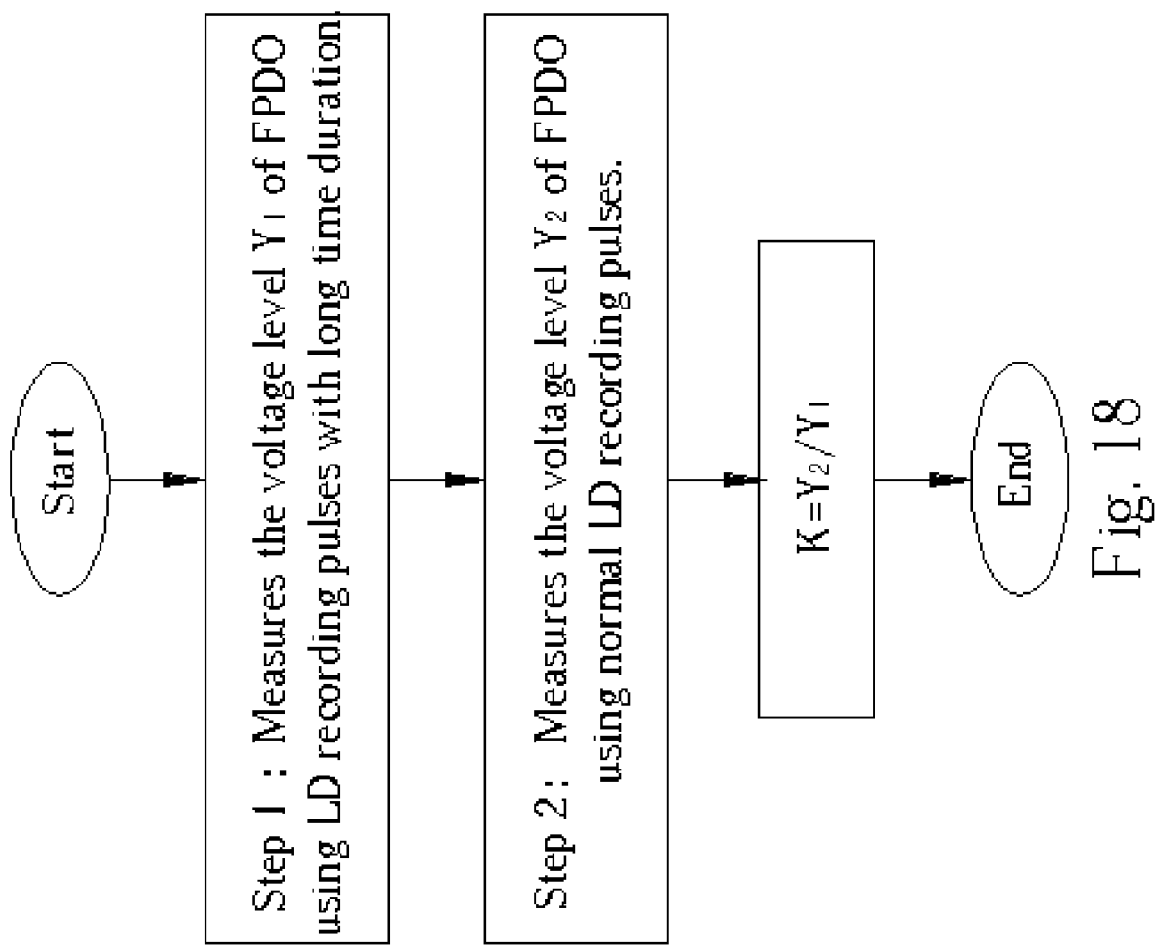
FIG. 18 shows a procedure for obtaining a calibration constant according to the present invention.

FIG. 18 shows an identification procedure for obtaining a calibration gain G, i.e. the inverse of the ratio of the measured power to the real power. This identification procedure may be performed before the optimal power calibration (OPC) procedure that is used to determine the optimal recording power for a specified recording speed. Additionally, if the identification procedure is executed under the condition of de-focus so that the light intensity of the LD is greatly reduced in the focal region, the test write power will not impair the optical storage medium. The identification procedure comprises two steps: Step 1 measures the voltage level $Y_1$ of the FPDO using LD recording pulses with a time duration long enough to allow the MPHO to closely reflect the maximum real power; step 2 measures the voltage level $Y_2$ under normal LD recording pulses. Obviously reversing the order of performing steps 1 and 2 are intended to fall within the scope of the present invention.

In step 1, control signals issued by the encoding unit for producing a recording pulse train of the LD with a long time duration are sent into the LD driving unit. Each recording pulse in the train can be set equal but it is not necessary that they are equal in length to produce correct results. The write power for the recording pulse can be specified as the normal writing power for the targeted recording speed by the reference power level setting unit and the time duration of the recording pulse is designed long enough so that the FPDO can attain steady state. This means that the FPDO and the MPHO can reflect the real optical power output. How to determine an appropriate pulse length is apparent for those skilled in this field, for example, the time duration corresponding to the largest recording pit length under the lowest recording speed is qualified. Let $Y_1$ denote the output of the multi-pulse peak-hold device. Then $Y_1$ represents the real optical power output.

In Step 2, random information data can be sent to the encoding unit to issue control signals for producing a recording pulse train of the LD with short time duration. The write power is set equal to the write power used in step 1 and the time duration of a recording pulse is dependent on the write strategy and is the same as the time duration of a real recording. Let $Y_2$ denote the output of the multi-pulse peak-hold device. Then $Y_2$ represents the maximum achievable FPDO, i.e. the maximum measurable output power.

Once the voltage values $Y_1$ and $Y_2$ have been obtained, there are at least two ways to properly calibrate the APC of the present invention. A first way is to increase the output of the peak-hold circuit by multiplying the output of the peak-hold circuit with a proportional constant to compensate for the difference from real LD output power. Therefore, the calibration gain $G_x$ in FIG. 8 can be determined as being equal to the inverse of $Y_2/Y_1$ which represents the response capability of the FPD under the specified recording speed. If the response speed of the FPD is approximately the same as the modulation speed of the recording pulse of the LD, $G_x$ approximately equals "1". $G_x$ becomes larger if the response speed of the FPD becomes slower than the modulation speed of the recording pulse of the LD.

Figure 19:
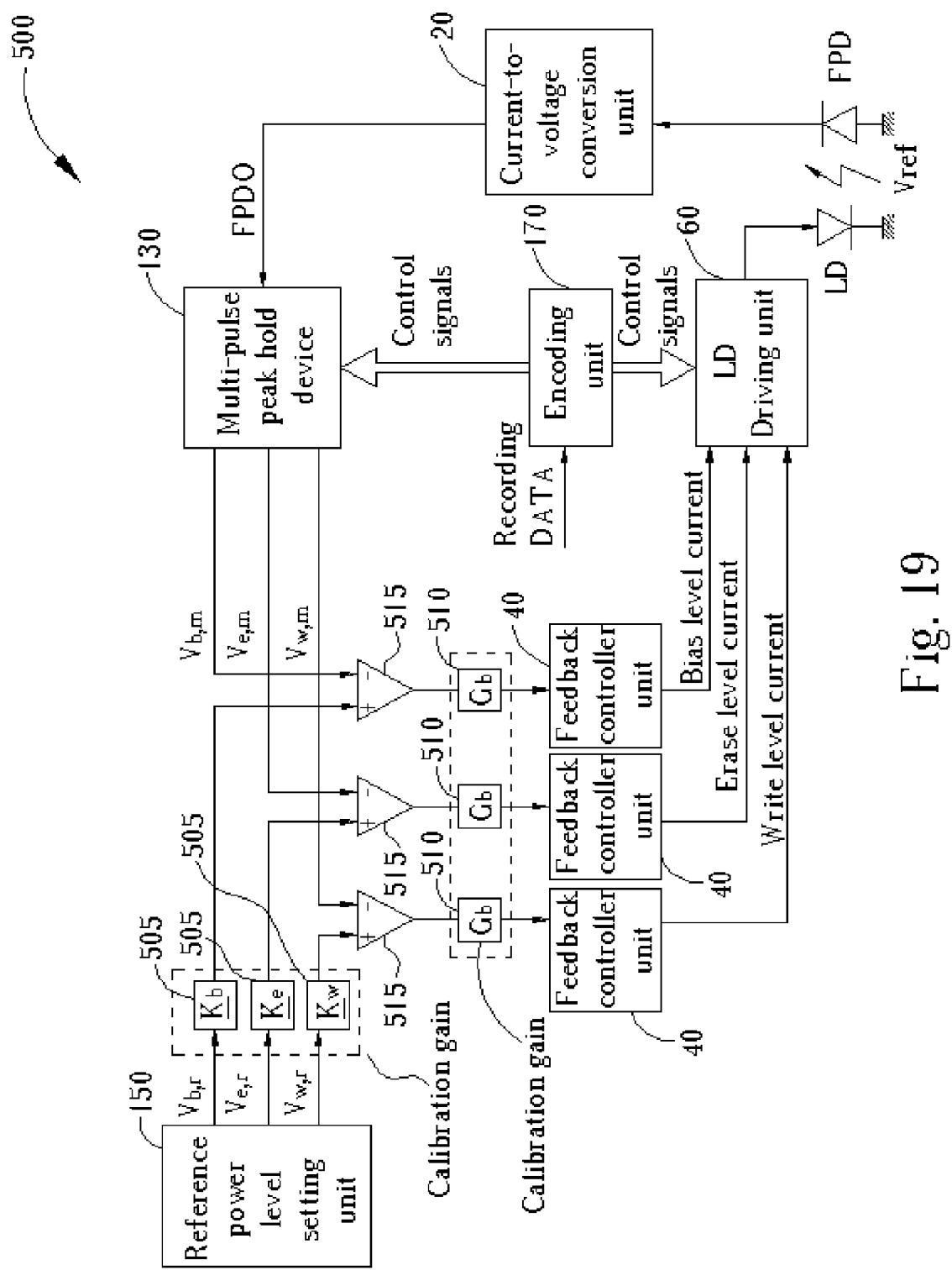
FIG. 19 is a block diagram of another multi-pulse peak-hold circuit according to the present invention.

A second way is to reduce the output of the reference power level setting unit 150 by multiplying the output of the reference power level setting unit 150 with a proportional constant 505 and to maintain the input to the feedback controller unit 40 unchanged by multiplying the output of an error amplifier 515 with another proportional constant 510. An alternative implementation as shown in FIG. 19 can be thus constructed for achieving stable power control even a FPD with insufficient response speed is used. Therefore, the calibration gain $G_x$ in FIG. 19 can be determined as being equal to $Y_1/Y_2$ and the calibration gain $K_x$ (proportional constant 505) can be determined as being equal to $Y_2/Y_1$. After performing the identification procedure shown in FIG. 18, the system controller will set the corresponding calibration gains $G_x$ and $K_x$ for each power level control loop in the APC structure 530. Consequently, precise power control for desired power levels can be achieved.

Additionally, it is well known that the reference power level setting unit is commanded by a system controller via power setting scripts in the firmware code. Therefore, the proportional constant $K_x$ can be set directly in the firmware code by modifying the power command setting. For example, if the original power command is $P=P_w$, then it can be changed to $P=K_w P_w$. Accordingly, the hardware shown in FIG. 19 for the calibration gain in the power level setting unit can be omitted.

In contrast to the prior art, the present invention utilizes a low-speed, peak-hold circuit to obtain, hold, and output a maximum of the FPDO. One example of the present invention uses a predetermined window signal or a plurality of window signals of a total duration long enough to allow the outputted MPHO to stabilize. After MPHO stabilization, an SH signal causes a low-speed and low-cost sample and hold circuit to sample and hold the outputted MPHO. When the MPHO has been sampled and held, a reset signal clears the outputted MPHO and reinitializes the peak-hold circuit. In accordance with the difference between a reference voltage and the output of the sample and hold circuit, a feedback controller unit outputs the required current level into an LD driving unit for producing desired recording pulses into the LD for recording information pits into the optical disc.

A proportional constant, or calibration gain, may be used to realize the real optical power output when, due to insufficient FPD response speed, the MPHO is different than the real optical power output. The proportional constant may be implemented either by adjusting the voltage level being outputted by the sample and hold circuit or by adjusting the reference voltage.

The use of a switch and a window signal or window signals allow the selection of a random sequence or a predetermined sequence of recording pulses insuring MPHO stabilization at a maximum of the FPDO. The use of a reset to reinitialize the peak-hold circuit insures an accurate reading of the present LD power level during each cycle. The use of the calibration gain insures that accurate power readings are obtained even when the FPD response speed is too slow to accurately follow the recording pulses. As such, the present invention offers improved performance and improved flexibility over the prior art without the requirement of expensive additional hardware.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of correcting for a difference between a real optical power output and a measured optical output in an automatic power control structure of an optical recording apparatus, the optical recording apparatus having a photodiode for sensing the optical output power of a laser diode and generating a sensed power level signal, the method comprising:

producing a first recording pulse train of normal writing power for a targeted recording speed from the laser diode of sufficient duration to allow the sensed power level signal to substantially stabilize;

measuring a first voltage level of the substantially stabilized sensed power level signal;

producing a second recording pulse train of normal writing power for the targeted recording speed from the laser diode of a duration equal to that of a real recording for the write strategy being used;

measuring a second voltage level of the sensed power level signal, the second voltage being approximately equal to a maximum voltage occurring in the sensed power level signal during the second recording pulse train; and calibrating the automatic power control structure according to the first voltage level and the second voltage level.

2. The method of claim 1 wherein calibrating the automatic power control structure comprises multiplying a maximum voltage occurring in the sensed power level signal with a proportional constant approximately equal to the inverse of a ratio of the second voltage level to the first voltage level.

3. The method of claim 1 wherein calibrating the automatic power control structure comprises adjusting a reference voltage level by multiplying the reference voltage level with a proportional constant approximately equal to a ratio of the second voltage level to the first voltage level.

4. The method of claim 3 wherein calibrating the automatic power control structure further comprises adjusting input to a feedback control unit by multiplying the input to the feedback control unit with a proportional constant equal to the inverse of the ratio of the second voltage level to the first voltage level.

5. The method of claim 1 further comprising producing the first recording pulse train under a condition of defocusing the light intensity of the laser diode sufficiently to ensure that the first recording pulse train will not impair an optical storage medium.

* * * * *